United States Patent [19]

Sasaoka et al.

[11] Patent Number: 5,283,847
[45] Date of Patent: Feb. 1, 1994

[54] METHOD OF MANUFACTURING AND EVALUATING AN OPTICAL FIBER COUPLER AND APPARATUS THEREFOR

[75] Inventors: Eisuke Sasaoka; Tetuya Kawakami, both of Kanagawa, Japan

[73] Assignee: Sumitomo Electric Industries, Ltd., Osaka, Japan

[21] Appl. No.: 937,720

[22] Filed: Sep. 1, 1992

[30] Foreign Application Priority Data

Sep. 9, 1991 [JP] Japan .................................. 3-228913
Oct. 25, 1991 [JP] Japan .................................. 3-306609

[51] Int. Cl.$^5$ ............................................... G02B 6/26
[52] U.S. Cl. ......................................... 385/43; 385/51; 385/52; 356/73.1
[58] Field of Search ...................... 385/43, 51, 52, 11; 356/73.1, 364, 365

[56] References Cited

U.S. PATENT DOCUMENTS

| | | | |
|---|---|---|---|
| 4,612,028 | 9/1986 | Abebe et al. | 65/4.2 |
| 4,737,005 | 4/1988 | Burns et al. | 385/27 |
| 4,904,085 | 2/1990 | Spillman, Jr. et al. | 356/365 X |
| 4,997,247 | 3/1991 | Stowe | 385/28 X |
| 5,005,175 | 4/1991 | Desurvire et al. | 385/142 X |
| 5,046,804 | 9/1991 | Fukuma et al. | 385/43 |

FOREIGN PATENT DOCUMENTS 0392924 10/1990 European Pat. Off.
0427705 5/1991 European Pat. Off.
8807690 10/1988 PCT Int'l Appl.
8912243 12/1989 PCT Int'l Appl.

OTHER PUBLICATIONS

Namihira et al, "Automatic Polarization Spectral Response Measurement Systems for Optical Fiber Couplers" Transactions of the Institute of Electronics, Information and Communication Engineers of Japan, vol. E70 1987, pp. 1080-1082.

*Primary Examiner*—John D. Lee
*Assistant Examiner*—Hemang Sanghavi
*Attorney, Agent, or Firm*—Cushman, Darby & Cushman

[57] ABSTRACT

A method of and apparatus for manufacturing and evaluating an optical fiber coupler in which the optical fibers are heated so that they are conjoined together through fusion and elongated to constitute the tapered portion of the optical fiber coupler, and characterized in that the tapered portion is housed and secured in a protective casing or the like as the portion remains positively twisted after the fusion conjoining and elongation of the fibers.

27 Claims, 4 Drawing Sheets

METHOD OF MANUFACTURING AND EVALUATING AN OPTICAL FIBER COUPLER AND APPARATUS THEREFOR

BACKGROUND OF THE INVENTION

1. Field of the Invention

The present invention relates to a method of and apparatus for manufacturing and evaluating an optical fiber coupler, in which a plurality of polarization maintaining optical fibers are partially heated so that they are conjoined together through fusion and elongated to constitute the coupler.

2. Related Art

An optical fiber coupler is a device for branching or coupling light signals transmitting through a plurality of optical fibers. The coupler is formed by partially heating the plural optical fibers so that they are conjoined together through fusion and elongated to constitute the coupler.

The portion of the coupler, which is decreased in diameter because of the fusion conjoining and the elongation, is called a tapered portion, and is housed and secured in a casing.

An important characteristic parameter of the coupler is a crosstalk property indicative of the degree of the maintaining of the polarization of the light. The crosstalk CT in the coupler in the case of entering X-polarized light into the coupler is expressed by an equation (1) as follows:

$$CT = 10 \cdot \log (P_Y/P_X) \text{ (dB)} \quad (1)$$

where $P_X$ and $P_Y$ in the equation (1) denote the optical powers of the X-polarized and Y-polarized components of the light emitting out of the coupler, respectively. The crosstalk usually takes a negative value. The smaller the value is, the better the polarization maintaining property of the coupler is. To attain a good crosstalk property of the coupler, the polarization axes of the optical fibers need to be made coincident with each other during the manufacturing of the coupler.

Figure 1:
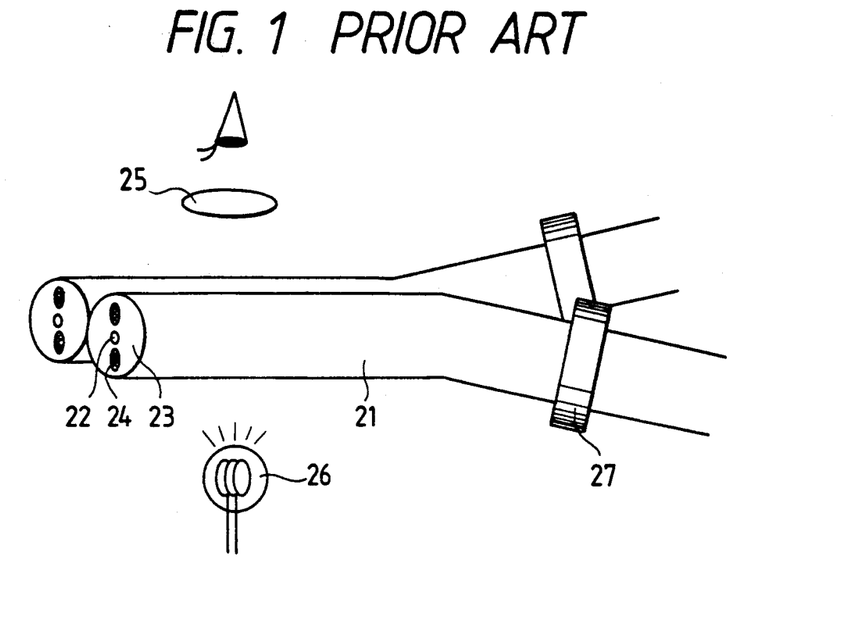
FIG. 1 is a cutaway view showing a conventional procedure of making main polarization axes of polarization maintaining optical fibers for such a coupler coincide with each other.

FIG. 1 is a cutaway view showing a conventional procedure of making the polarization axes, of polarization maintaining optical fibers for such a coupler, coincide with each other. FIG. 1 shows an optical fibers 21 provided with a core part 22, a clad part 23 and a stress applying part 24, a microscope 25, an illumination light source 26, and rotary clamps 27. Before the optical fibers 21 are fused and conjoined together, light emitting from the light source 26 and transmitting through the fibers is observed through the microscope 25 to find out the directions of the stress applying parts 24, which determine the directions of the main polarization axes of the fibers. The rotary clamps 27 are then turned to rotate the optical fibers 21, and secured in such positions that the polarization axes of the fibers are coincident with each other.

However, the degree of the coincidence is not high enough in the conventional method. In other words, it is unavoidable to make some discrepancy between the polarization axes of the fibers. Further, even if the axes may perfectly coincide with each other before the fibers are fused and conjoined together, the fibers undergo a twist, or the like, during the fusion conjoining and/or elongation of the fibers to make the axes incoincident with each other to deteriorate the crosstalk property of the coupler at the time of the completion of the manufacturing thereof. This is a problem with the conventional method of manufacturing an optical fiber coupler.

Figure 2:
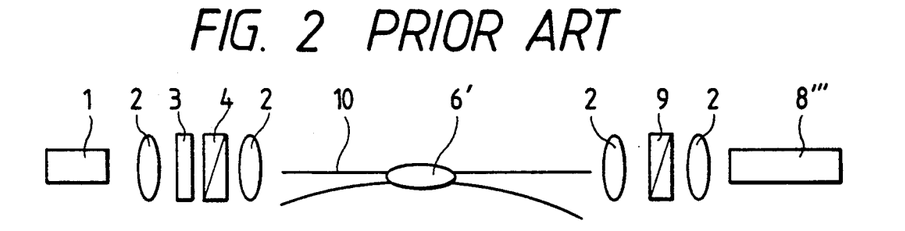
FIG. 2 is a schematic view showing a conventional measuring system.

On the other hand, since the coupler sometimes changes in properties, such as, branching ratio and excess loss property, depending on the state of polarization of light which enters into the coupler, the properties of which need to be evaluated as to polarization. If the coupler is constituted by polarization maintaining optical fibers, the crosstalk property of the coupler, which indicates how much the state of polarization of light entering into the coupler is preserved, is an important characteristic parameter. To conventionally evaluate the properties of such couplers as to polarization, measurement is performed on the coupler through the use of a measuring system as shown in FIG. 2.

For the above-mentioned conventional evaluation, light whose state of polarization is modulated by a polarizer 4, a wavelength plate 3 and so forth is required to be condensed by lenses 2 and then enters into the optical fiber 10 of the coupler 6 from one end thereof. To efficiently enter the light into the fiber 10, the light needs to be concentrated to the core of the fiber. For that purpose, a finely movable mechanical stage on which the fiber is put moves for adjustment so as to maximize the monitored power of the light emitting out of the fiber. It is necessary to set the fiber on the measuring system at each of both the ends of the coupler and move the mechanical stage for adjustment, at the time of each of the manufacturing and evaluation of the coupler. In case that the coupler is constituted by polarization maintaining optical fibers, it is necessary to not only perform the setting and the movement, but also make the polarization axis of the fiber coincide with that of the light which enters into the fiber. These are additional problems associated with the conventional methods of manufacturing and evaluating an optical fiber coupler because the conventional methods are quite intricate and take a lot of time for measurement steps.

SUMMARY OF THE INVENTION

The present invention was made in order to solve the afore-mentioned problems accompanying the conventional coupler manufacturing and evaluating apparatus and processes. Accordingly, it is an object of the invention to provide an optical fiber coupler having a good crosstalk property.

Another object of the invention is to provide a method of manufacturing an optical fiber coupler, in which the error in making the main polarization axes of a plurality of optical fibers for the coupler coincide with each other, and the noncoincidence between the fibers, which is caused during the fusion conjoining of the fibers and/or the elongation thereof, are corrected after the elongation so as to improve the crosstalk property of the coupler.

Still another object of the invention is to provide a method of and apparatus for evaluating an optical fiber coupler with respect particularly to a crosstalk property thereof without being intricate or taking a lot of time.

It is still another object of the present invention to provide an optical fiber coupler evaluation method and apparatus in which the measured value of the crosstalk is compensated for in terms of the crosstalk of light emitting from the optical fiber, which is measured before the coupler is manufactured.

In an example of the method and apparatus of the present invention, optical fibers are heated so that they are conjoined together through fusion and elongated to constitute a tapered portion of the optical fiber coupler. The example is characterized in that the tapered portion is housed and secured in a protective casing, or the like, as the portion remains positively twisted after the fusion conjoining and elongation of the fibers.

Another example of the method and apparatus of the present invention is characterized in that the tapered portion of the optical fiber coupler is positively twisted to minimize the crosstalk in the coupler.

When the tapered portion is positively twisted, the crosstalk in the optical fiber coupler may be monitored to control the twisting so as to minimize the crosstalk.

According to another aspect of the invention, the method and apparatus is characterized in that a plurality of elongated, polarization maintaining, optical fibers are sent out and heated so that they are conjoined together through fusion and elongated to constitute the coupler; linearly polarized light whose polarization axis is coincident with the polarization axis of the optical fiber is generated through the use of a light source, lenses, a quarter-wavelength ($\lambda/4$) plate and a polarizer and enters into the fiber from one end thereof to obtain a prescribed branching ratio; and the crosstalk of the light emitting out of the coupler is thereafter measured through the use of lenses, a polarization beam splitter, power meters and so forth.

The polarization axes of optical fibers for polarization maintaining optical fiber coupler are likely to be incoincident with each other at the time of setting of the fibers, or will become incoincident with each other due to the twisting of the fibers during the fusion conjoining thereof or the elongation thereof. Since this noncoincidence is left in the conventional method of manufacturing the coupler, the crosstalk property of the coupler is deteriorated. Besides, since the degree of the noncoincidence varies from coupler to coupler, the couplers differ from each other in crosstalk property.

However, in the method and apparatus provided in accordance with the present invention, the noncoincidence is corrected by positively twisting the tapered portion of the coupler after the elongation of the optical fibers to prevent the crosstalk property of the coupler from being deteriorated by the noncoincidence. Even if the degree of the noncoincidence varies from coupler to coupler, the noncoincidence can be corrected by positively twisting the tapered portion of the coupler, to make the crosstalk property of the couplers good and not different from each other.

Further, as for the above-described conventional method and apparatus of the evaluation of the properties of the couplers as to polarization, it is necessary to set each of the light incoming and outgoing fibers of the coupler on the measuring system and modulate an optical system, at the time of each of the manufacturing and evaluation of the coupler. For that reason, the efficiency of the evaluation is lower. On the other hand, in the method and apparatus provided according to the present invention, the crosstalk properties of the coupler are evaluated as to polarization when the coupler is manufactured by sending out the optical fiber already set on the measuring system at one end of the fiber and adjusted to an optical system. For that reason, it is not necessary in the present invention method and apparatus to set the optical fibers on the measuring system and adjust the fiber to the optical system at the light incoming side of the coupler at the time of the manufacturing and evaluation of the coupler. This results in making the efficiency of the evaluation in the method and apparatus of the present invention higher than that in the conventional method and apparatus.

In case that the coupler is constituted by polarization maintaining optical fibers, both moving a finely movable mechanical stage for adjustment at the light incoming side of the coupler and making the polarization axis of the fiber coincide with that of the polarizer are not required by the present invention. For that reason, the efficiency of the evaluation in the present invention method and apparatus is much higher than that in the conventional method.

There is a problem that under some conditions of measurement, the change in the mechanical stage of polarization of the light in the optical fiber wound on a bobbin is not negligible but causes an error in the measurement. However, that problem can be solved if the mechanical stage of polarization of the light emitting out of the optical fiber wound on the bobbin is measured before the manufacturing of the coupler and the result of the measurement during or after the manufacturing is then compensated for in terms of that of the measurement before the complete manufacturing.

DESCRIPTION OF THE PREFERRED EMBODIMENTS

Figure 3:
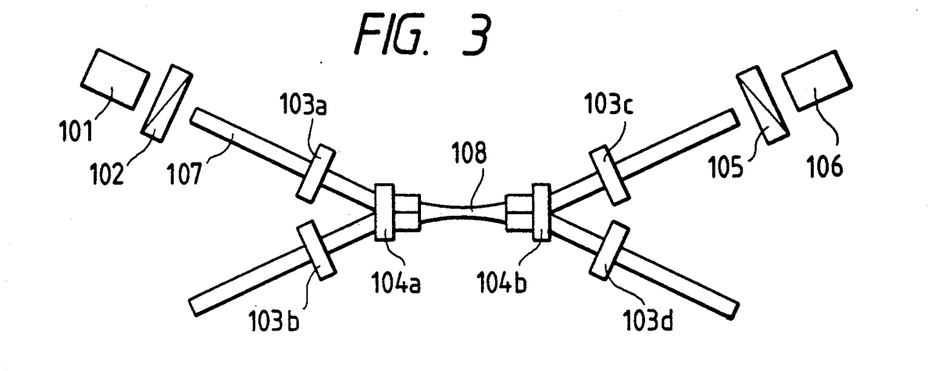
FIG. 3 is a schematic view showing an apparatus for manufacturing an optical fiber coupler.

FIG. 3 is a schematic view showing an apparatus for manufacturing an optical fiber coupler. This figure will also be used for describing a method of a manufacturing the coupler. FIG. 3 shows a light source 101, a polarizer 102, a rotary clamp 103a at the light incoming portion of a main line, a rotary clamp 103b at the light incoming portion of a branch line, a rotary clamp 103c at the light outgoing portion of the main line, a rotary clamp 103d at the light outgoing portion of the branch line, optical fiber clamps 104a and 104b for the elongation of optical fibers, an analyzer 105, a power meter 106, an optical fiber 107 constituting an end of the coupler, and a tapered portion 108 of the coupler, in the state that the elongation is completed.

After the elongation of the optical fibers, the fiber clamps 104a and 104b are disengaged from the fibers so that the fibers can be freely rotated. The rotary clamps 103a, 103b, 103c and 103d are thereafter turned to rotate the fibers to twist the tapered portion 108 of the coupler. One of the fibers is used as the main line, and testing light generated by the light source 101 and the polarizer 102 enters into the main line fiber. The, light emitting out of the main line fiber is transmitted through the analyzer 105 and then measured by the power meter 106 to calculate the crosstalk in the coupler. Light emitting out of the other fiber as the branch line may also be measured for the calculation of the crosstalk.

The crosstalk property of the coupler can be improved when the tapered portion 108 is twisted to correct the noncoincidence between the main polarization axes of the fibers, which is caused during the adjustment of the axes, the fusion conjoining of the fibers or the elongation thereof. The tapered portion 108, twisted for the correction of the noncoincidence, is then housed and secured in a casing. The casing aids in manufacturing the polarization maintaining optical fiber coupler with a good crosstalk property.

In one example, a polarization maintaining, optical fiber coupler having a wavelength of 0.85 $\mu$m was manufactured of two optical fibers according to the method of the present invention. The fibers were polarization maintaining, optical fibers with a UV curable coating of 0.82 $\mu$m in cutoff wavelength. After the fibers were conjoined together through fusion and elongated to constitute the coupler, the fiber clamps 104a and 104b were disengaged from the fibers so that the tapered portion 108 of the coupler could be freely rotated. The rotary clamps 103a, 103b, 103c and 103d were then turned to rotate the tapered portion 108 to appropriately twist it.

Figure 4:
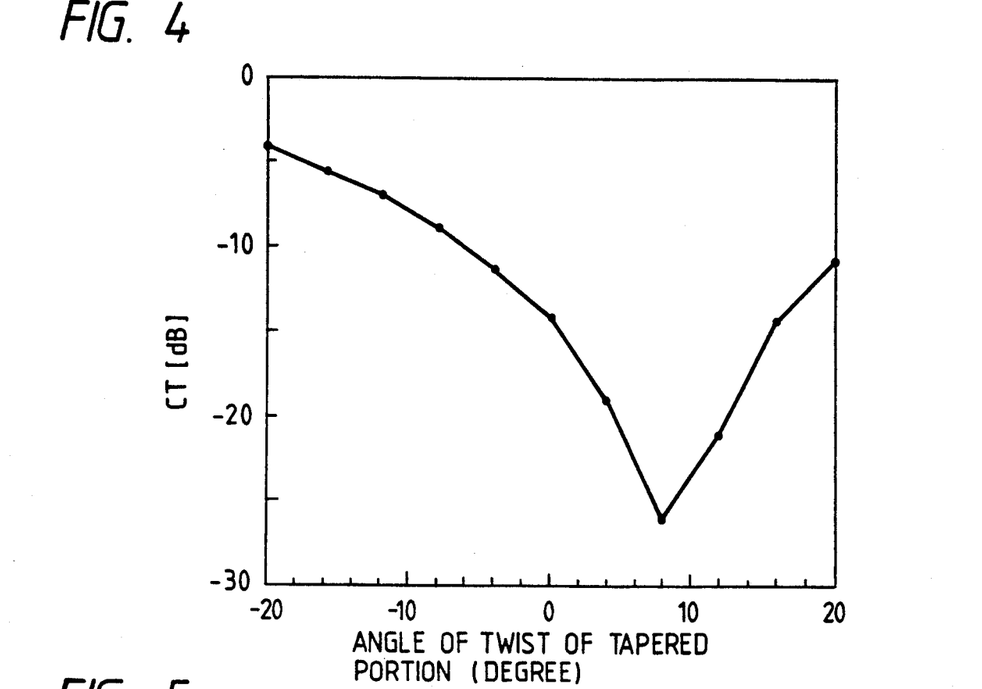
FIG. 4 is a graph showing a result of measurement of the crosstalk in a coupler.

FIG. 4 is a graph showing the result of the measurement of the crosstalk in the coupler. It can be understood from FIG. 4 that the crosstalk property of the coupler can be improved by twisting the tapered portion 108. After the fibers were conjoined together through fusion and elongated to constitute the coupler, the tapered portion 108 was twisted while the crosstalk in the coupler was being monitored. When the tapered portion 108 had been twisted by such an angle as to optimize the crosstalk property of the coupler, the tapered portion was housed and secured in a casing.

Twenty such polarization maintaining, optical fiber couplers were manufactured according to the method of the present invention. The crosstalk property of each of the couplers was evaluated before and after the tapered portion thereof was twisted and then housed and secured in a casing.

Figure 5:
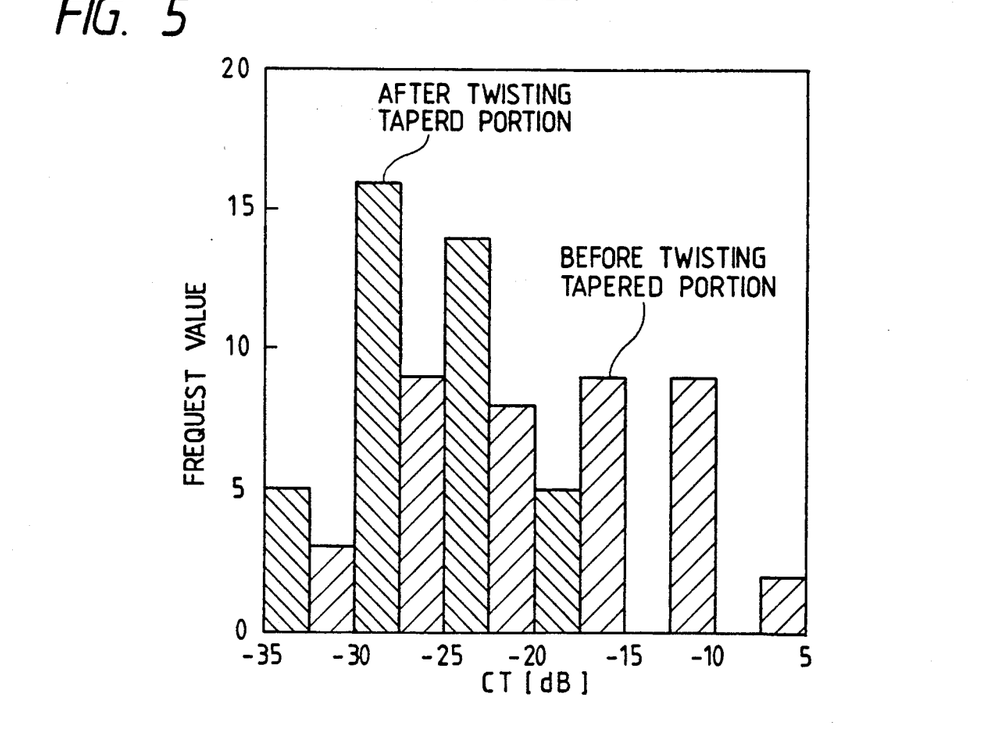
FIG. 5 a graph showing a frequent value distribution derived from results of an evaluation.

FIG. 5 is a graph showing a frequent value distribution derived from the results of the evaluation. It can be understood from FIG. 5 that the twisting of the tapered portion resulted in improving the crosstalk property and reducing the deviation of the crosstalks in the couplers. Therefore, the method of the present invention is quite effective and useful in producing polarization maintaining optical fiber couplers.

The present invention is not confined to the embodiment described above, but may be embodied or practiced in other various ways without departing from the essential character of the invention. For example, the coupler may be manufactured differently as long as the tapered portion is appropriately twisted after the elongation of the optical fibers. An optical fiber coupler of desired definite crosstalk can properly be manufactured in accordance with the invention.

Figure 6:
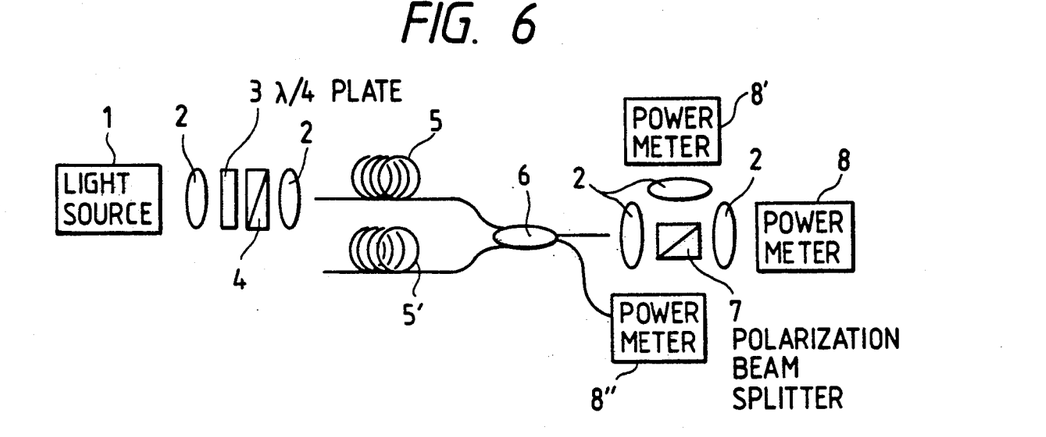
FIG. 6 is a schematic view showing an apparatus of evaluating an optical fiber coupler.

FIG. 6 is a schematic view showing an apparatus for evaluating an optical fiber coupler with respect particularly to the crosstalk property thereof. FIG. 6 is used also for describing the method of evaluating the optical fiber coupler.

FIG. 6 shows a measuring system which is used for the evaluation and includes a light source 1, lenses 2, a quarter-wavelength ($\lambda$/4) plate 3, a polarizer 4, a polarization beam splitter 7, and power meters 8, 8' and 8''. The power of polarized light can be measured by the system through either or main and branch lines of the coupler to determine the crosstalk therein.

In the method and apparatus provided according to the present invention, the properties of an optical fiber coupler made of bobbin-wound, polarization maintaining, optical fibers 5 and 5' were evaluated as to polarization through the use of the measuring system.

The light source 1 was an LD light source which emits linearly polarized light of 0.85 $\mu$m in wavelength. The light was changed into mutually parallel rays by the lens 2. Circularly polarized light was made from the rays by the quarter-wavelength ($\lambda$/4) plate 3 for the wavelength of 0.85 $\mu$m.

The linearly polarized light, whose polarization axis was coincident with the polarization axis of the bobbin-wound, polarization maintaining, optical fiber 5, as the main line of the coupler, was made from the circularly polarized light by the polarizer 4, condensed by the other lens 2, and entered into the fiber from one end thereof. The light emitting out of the fiber 5 was changed into mutually parallel rays by the other lens 2. The polarization beam splitter 7 divided the rays into incident polarized components and other components proceeding perpendicularly to the former. The power of the former components and that of the latter were measured by the optical power meters 8 and 8' to determine the crosstalk in the coupler.

To evaluate the coupler in branching ratio and excess loss, the power of the light emitting out of the main line fiber of the coupler and that of light emitting out of the branch line fiber thereof are measured. To measure the power of the light emitting out of the main line fiber, the power of the incident polarized components and that of the other polarized components proceeding perpendicularly to the former are added to the each other, and a loss due to optical system, such as the lenses and the polarized beam splitter, is compensated for.

As an example, the coupler of 50% in branching was made of polarization maintaining, optical fibers 5 and 5', each of which was for the wavelength of 0.85 $\mu$m, was 100 meters in length and −39 dB in crosstalk. During the making, the crosstalk in the coupler was measured as described above. After that, the crosstalk was measured in the conventional method to find out whether the measured value of the crosstalk was equal to that measured in the method provided in accordance with the present invention, and it was confirmed that the efficiency of the evaluation in the latter method was higher than that of the evaluation in the former.

Figure 7:
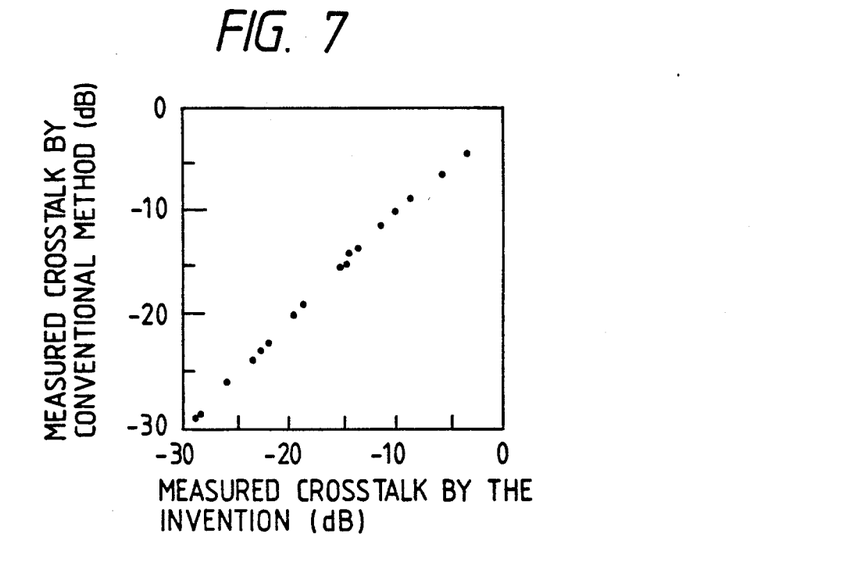
FIG. 7 is a graph showing the relationship between crosstalk values measured in the conventional and present method.

FIG. 7 is a graph showing the relationship between the crosstalk values measured by both methods. As apparent from FIG. 7, the crosstalk values are very close to each other. Since amount of time of the measurement in the conventional method was 30 minutes and that of the measurement in the present method was 12 minutes, the efficiency of the measurement in the latter method is much higher than that of the measurement in the former.

In the method provided according to the present invention, the properties of such optical fiber coupler made of other bobbin-wound, polarization maintaining, optical fibers which were for a wavelength of 0.85 μm, were 3,000 meter in length and −23 dB in crosstalk were evaluated as to polarization through the use of the measuring system shown in FIG. 2.

Figure 8:
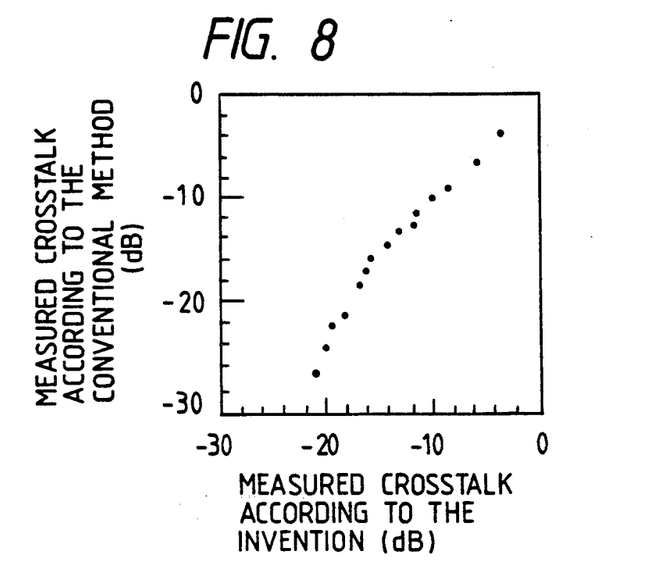
FIG. 8 is a graph showing a relationship between crosstalks in couplers, which was measured in the conventional and present method.

FIG. 8 is a graph showing the relationship between the crosstalk in the coupler, which was measured by the method of the present invention, and was measured by the conventional method. It can be understood from FIG. 8 that the difference between the crosstalks measured in both methods begins to increase at about −20 dB due to the crosstalk in the bobbin-wound, optical fiber itself. The measured value of the crosstalk, which was measured in the present method, was compensated on the basis of the fact that the crosstalk in the bobbin-wound optical fiber was −23 dB.

Figure 9:
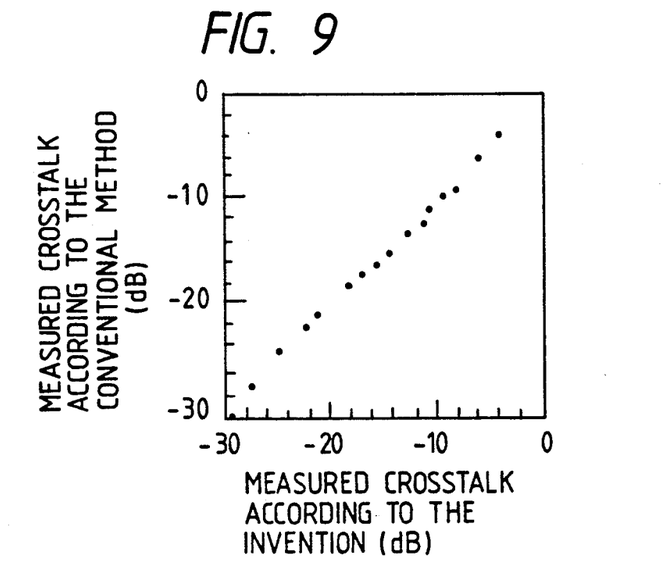
FIG. 9 is a graph showing a relationship between a compensated measured value of a crosstalk and crosstalk measured in the conventional method.

FIG. 9 is a graph showing the relationship between the compensated measured value and the crosstalk measured in the conventional method. It can be understood form FIG. 9 that the compensated measured value and the crosstalk measured in the conventional method are close to each other. Therefore, even if there is a polarized state change, such as a crosstalk deterioration in the bobbin-wound, optical fiber, no problem takes place if the state of polarization of light emitting out of the bobbin-wound, optical fiber is measured in advance and compensation is performed on the basis of the result of the measurement.

A procedure for compensating the measured value of the crosstalk in the coupler on the basis of the crosstalk in the bobbin-wound, optical fiber itself is described hereinbelow. X-polarized light is first entered into the bobbin-wound, optical fiber. The crosstalk $CT_0$ in only the bobbin-wound, optical fiber is expressed by an equation (2) as follows:

$$CT_0 = 10 \log (P_{Y0}/P_{X0}) \quad (2)$$

where $P_{X0}$ and $P_{Y0}$ in the equation (2) denote the optical powers of the X-polarized and Y-polarized components of the light emitting out of the bobbin-wound, optical fiber.

The optical powers $P'_X$ and $P'_Y$ of the X-polarized and Y-polarized components of the light emitting out of the bobbin-wound optical fiber after the manufacturing of the coupler are expressed by equations (3) and (4) as follows:

$$P'_X = S_X(P_{X0} - \gamma' P_{Y0}) \quad (3)$$

$$P'_Y = S_Y P_{Y0} + S_X \gamma' P_{X0} \quad (4)$$

where $S_X$, $S_Y$ and $\gamma'$ in the equations (3) and (4) denote the branching ratios for the X-polarized and the Y-polarized components, and the ratio of the conversion of power from the X-polarized component to the Y-polarized one in the coupler, that is, the crosstalk in the coupler, respectively. The conversion of power from the Y-polarized component to the X-polarized one is negligible.

The crosstalk $CT'$ in the bobbin-wound optical fiber after the manufacturing of the coupler is calculated through the use of the equations (3) and (4) in the case of $P_{X0} > \gamma' P_{Y0}$ and $S_X \approx S_Y$ as follows:

$$CT = 10 \cdot \log(P'_Y/P'_X) \quad (5)$$
$$\approx 10 \cdot \log(P_{Y0}/P_{X0} + \gamma') \text{ (dB)}$$

where the ration $\gamma'$ is calculated through the use of the equations (2) and (5) as follows:

$$\gamma' = 10^{CT/10} - 10^{CT_0/10} \quad (6)$$

As a result, the crosstalk CT in the coupler is determined as follows:

$$CT = 10 \cdot \log \gamma' \text{ (dB)} \quad (7)$$

When the crosstalk in the bobbin-wound optical fiber alone is −23 dB and that in the fiber after the manufacturing of the coupler from the fiber is −20 dB, for example, the compensated measured value of the crosstalk in the coupler is determined as follows:

$$\gamma' = 10^{-20/10} - 10^{-23/10} = 0.00499$$

$$CT = 10 \cdot \log 0.00499$$
$$= -23 \text{ (dB)}$$

In a polarization maintaining, optical fiber coupler manufacturing apparatus and method provided in accordance with the present invention, the crosstalk property of the polarization maintaining optical fiber coupler can be improved even if the main polarization axes of optical fibers for the coupler are not perfectly coincident with each other or are made noncoincident with each other during the fusion conjoining of the fibers or the elongation thereof. For that reason, a coupler, having a good crosstalk property, can be manufactured with high reproducibility in the apparatus and method of the present invention.

Further, according to the present invention, it is unnecessary to perform the complicated adjustment of an incident stage, a polarizer and so forth at the time of the evaluation of the properties of and optical fiber coupler as to polarization. For this reason, the efficiency of the evaluation is enhanced.

What is claimed is:
1. A method of manufacturing an optical fiber coupler comprising the sequential steps of:
   heating a plurality of polarization maitaining, optical fibers having a main line fiber and a branch line fiber to conjoin together through fusion and elongated thereby to constitute a tapered portion of the coupler;
   positively twisting said tapered portion of the coupler; and
   housing and securing said tapered portion as said portion remains positively twisted.
2. The method of claim 1, wherein said tapered portion of the coupler is twisted so that a polarization axes of said main line and branch line fibers coincide with each other.
3. The method of claim 1, wherein said tapered portion of the coupler is twisted to control the crosstalk in the optical fiber coupler to be a desired definite value.
4. The method of claim 1, wherein said tapered portion of the coupler is twisted to control the crosstalk in the optical fiber coupler to be minimized.

5. The method of claim 3, further comprising a step of monitoring the crosstalk in the optical fiber coupler while twisting said tapered portion of the coupler.

6. The method of claim 5, wherein said step of monitoring the crosstalk is performed by measuring a power of light emitting out of said main line fiber.

7. The method of claim 6, wherein said step of monitoring the crosstalk is performed by measuring said power of light emitting out of said main line fiber.

8. The method of claim 6, wherein said step of monitoring the crosstalk is performed by measuring a power of light emitting out of said branch line fiber.

9. The method of claim 1, wherein said main line optical fiber and said branch line optical fiber are each wound on a respective bobbin.

10. The method of claim 9, further comprising a step of entering linearly polarized light, a polarization axis of which is coincident with a polarization axis of said main line fiber, from one end of said main line fiber so that a prescribed branching ratio is obtained, and a crosstalk of light emitting out of said main line fiber is measured.

11. The method of claim 10, wherein said measured value of the crosstalk is compensated for in terms of the crosstalk in said main line fiber, which is measured before said optical fiber coupler is constituted.

12. The method of claim 11, wherein said measure value of the crosstalk is compensated for in accordance with following equations:

$$\gamma' = 10^{CT/10} - 10^{CT_o/10}$$

$$CT = 10 \cdot \log \gamma' \ (dB)$$

where $\gamma'$ represents the ratio of conversion of power from an X-polarized component to a Y-polarized one in said coupler, $CT'$ denotes the crosstalk in the bobbin-wound optical fiber after manufacturing said coupler, and $CT_0$ represents the crosstalk in only said bobbin-wound optical fiber.

13. A method of evaluating an optical fiber coupler comprising the sequential steps of:
(a) heating a main line fiber and a branch line fiber so that a portion thereof is conjoined together through fusion;
(b) elongating the conjoined portion to create a tapered portion of the optical fiber coupler;
(c) emitting from a light source linearly polarized light of a predetermined wavelength;
(d) changing the emitted light into mutually parallel rays;
(e) circularly polarizing the emitted light;
(f) condensing the emitted light;
(g) directing the emitted light into one end of the main line fiber of the optical fiber such that a polarization axis of the emitted light is coincident with a polarization axis of the main line fiber;
(h) changing the light emitting out of the other end of the main line fiber into mutually parallel rays;
(i) dividing the mutually parallel rays into incident polarized components and other perpendicular components;
(j) measuring the power of the components; and
(k) determining the crosstalk of the optical fiber coupler based on the measured power of the components.

14. The method of claim 13, further comprising a step of, before heating and elongating the optical coupler, measuring a value of the state of polarization of light emitting out of the main line fiber and compensating for the measured value, in terms of the cross talk, in said optical coupler.

15. The method of claim 14, wherein said measure value is compensated for in accordance with following equations:

$$\gamma' = 10^{CT/10} - 10^{CT_0/10}$$

$$CT = 10 \cdot \log \gamma' \ (dB)$$

where $\gamma'$ represents the ratio of conversion of power from an X-polarized component to a Y-polarized one in said coupler, $CT'$ denotes the crosstalk in the main fiber after heating and elongating said coupler, and $CT_0$ represents the crosstalk in only said main fiber.

16. The method of claim 13, further comprising a step of twisting said fibers after heating and elongating said optical coupler.

17. The method of claim 16, wherein said fibers are twisted so that a polarization axes of said said main line and branch line fibers coincide with each other.

18. The method of claim 16, wherein said main line and branch line fibers are twisted to control the crosstalk in the optical fiber coupler to be a desired definite value.

19. The method of claim 17, wherein said main line and branch line fibers are twisted to control the crosstalk in the optical fiber coupler to be minimized.

20. The method of claim 13, further comprising a step of monitoring the crosstalk in the optical fiber coupler while twisting said fibers.

21. The method of claim 20, wherein said step of monitoring the crosstalk is performed by measuring said power of light emitting out of said main line fiber.

22. The method of claim 20, wherein said step of monitoring the crosstalk is performed by measuring said power of light emitting out of said branch line fiber.

23. An apparatus for manufacturing an optical fiber coupler, comprising:
a plurality of optical fibers having a main line fiber and a branch line fiber;
a light source emitting light into at least one of said main line fiber and said branch line fiber;
a polarizer provided between said light source and said at least one fiber;
a pair of clamps connecting said main line fibers to said branch line fibers for elongating said fibers to constitute the coupler, said clamps disengaging from said fibers after the coupler is constituted;
a power meter for measuring the crosstalk in said at least one fiber;
an analyzer provided between said at least one fiber and said power meter; and
rotary clamps for twisting said fibers while said clamps disengage from said fibers to control the cross talk of said fibers to an optimum minimum value.

24. The apparatus of claim 23, wherein said power source and said power meter face to said main line fiber.

25. The apparatus of claim 23, wherein said power source and said power meter face to said branch line fiber.

26. The apparatus of claim 23, wherein said coupler is housed and secured in a casing after appropriately twisting said fibers.

27. A method of manufacturing an optical fiber coupler comprising the sequential steps of:
(a) heating a main line fiber and a branch line fiber so that a portion thereof is conjoined together through fusion;
(b) elongating the conjoined portion to create a tapered portion of the optical fiber coupler;
(c) twisting the tapered portion while simultaneously monitoring a crosstalk property of the coupler;
(d) housing the tapered portion in a protective casing while the tapered portion remains twisted at a position that substantially corresponds to an optimum minimum crosstalk property of the coupler.

* * * * *